United States Patent [19]

Inoue

[11] Patent Number: 4,686,343
[45] Date of Patent: Aug. 11, 1987

[54] METHOD OF AND APPARATUS FOR RESETTING A WIRE ELECTRODE IN AN OPERATING SETUP ON AN ELECTROEROSION MACHINE

[75] Inventor: Kiyoshi Inoue, Tokyo, Japan

[73] Assignee: Inoue-Japax Research Inc, Kanagawaken, Japan

[21] Appl. No.: 828,119

[22] Filed: Feb. 10, 1986

Related U.S. Application Data

[60] Division of Ser. No. 648,292, Sep. 6, 1984, Pat. No. 4,608,475, which is a continuation of Ser. No. 261,269, May 6, 1981, Pat. No. 4,513,191.

[51] Int. Cl.$^4$ .............................................. B23P 1/08
[52] U.S. Cl. .............................. 219/69 W; 219/69 M; 219/69 E; 83/926 B
[58] Field of Search .............. 219/69 M, 69 W, 69 R, 219/69 E, 68; 83/926 B

[56] References Cited

U.S. PATENT DOCUMENTS

| 4,242,559 | 12/1980 | Roemer et al. | 219/69 W |
| 4,350,864 | 9/1982 | Janicke et al. | 219/69 W |
| 4,367,392 | 1/1983 | Girardin | 219/69 W |

FOREIGN PATENT DOCUMENTS 2732770 2/1979 Fed. Rep. of Germany .... 83/926 B

Primary Examiner—M. H. Paschall
Attorney, Agent, or Firm—Karl F. Ross; Herbert Dubno

[57] ABSTRACT

An improved method and apparatus for automatically resetting a wire electrode in an operating setup on an electroerosion (e.g. EDM) machine is disclosed. Upon termination of a given machining operation commenced with a starting hole in the workpiece, the wire electrode spanning in a continuous stretch between a supply side and a collection side is broken in a region adjacent to the workpiece and at one of the opposite sides thereof by forming the wire electrode in the region with at least two coplanar grooves substantially symmetrical about the axis thereof and then applying tension to the wire electrode to break the latter in the region. The broken wire electrode is threaded its broken end into and through a new starting hole preformed in a workpiece for machining a contour therein in a subsequent machining operation to reestablish the continuous stretch of the wire electrode between the supply and collection sides. An air jet may be applied at least in the region of the wire electrode to be heated, grooved and broken to blow off residue of the machining liquid which may remain adherent on the wire electrode to allow the latter to be uniformly heated without any localized thermal stress. This also allows the wire electrode which is broken to form a straight broken end.

2 Claims, 6 Drawing Figures

METHOD OF AND APPARATUS FOR RESETTING A WIRE ELECTRODE IN AN OPERATING SETUP ON AN ELECTROEROSION MACHINE

CROSS REFERENCE TO RELATED APPLICATIONS

This application is a division of Ser. No. 648,292 filed Sept. 6, 1984 (Now U.S Pat. No, 4,608,475) as a continuation of Ser. No. 261,269 filed May 6, 1981 (Now U.S. Pat. No. 4,513,191).

FIELD OF THE INVENTION

The present invention relates generally to travelling-wire electroerosion processes and, more particularly, to an improved method of and apparatus for automatically resetting a wire electrode in an operating setup on an electroerosion machine.

The term "electroerosion" used herein is intended to refer broadly to a process of electrical machining in general, including an electrical discharge machining (EDM) process, electrochemical machining (ECM) process and electrochemical-discharge machining (ECDM) process.

The term "wire electrode" used herein is intended primarily to refer to an elongated electrode in the form of a thin continuous wire, but may include any other similar elongate form of the electroerosion electrode such as a tape.

BACKGROUND OF THE INVENTION

In traveling-wire electroerosion precesses, a continuous wire electrode is axially transported by a wire axial drive means from a supply means to a collection means. In the path of wire travel, a pair of machining guide members are commonly disposed at opposite sides of an electrically conductive workpiece to span the traveling wire electrode straightforwards thereacross traversing the workpiece, thus positioning the wire electrode in a precise machining relationship with the workpiece. The electroerosion machine includes a power supply for passing an electrical machining current, typically or preferably in the form of a succession of electrical pulses, between the wire electrode and the workpiece across a machining gap flooded with a machining liquid, e.g. water or an aqueous solution, to electroerosively remove material from the workpiece. As the material removal proceeds, the workpiece is displaced transversely relative to the axis of the wire electrode rode along a prescribed feed path under the command, preferably, of a numerical controller, so that a desired contour of cut is generated in the workpiece.

Wire electroerosion machines are very often required to machine a number of contours in a workpiece or similar workpieces in a sequence of operations. In each operation, it is necessary that machining should start with a hole preformed at a given point associated with each contour desired. Thus, prior to proceeding with any given machining operation, the wire electrode must be threaded or set through a strating hole and, subsequent to accomplishment of such machining operation, the wire electrode must be removed from the machined contour or the hole and again threaded or reset through another starting hole associated with another contour desired in the same or another workpiece. Each resetting operation needed after a given machining operation before another therefore requires breaking, at a region immediately above or below the workpiece, the wire electrode extending continuously between the supply and collection sides, repositioning relatively the axis of the wire electrode and the worktable carrying the workpiece or workpieces, threading the wire electrode from the cut end through the starting hole associated with the new contour to be machined and then reloading the threaded wire electrode in the wire axial drive or transpotation means downstream of the guide member to establish its ocntinuous axial travel from the supply side to the collection site.

In order to eliminate the necessity of the operator's manual intervention, an automatic wire resetting arrangement has advantageously been provided which is designed to execute the foregoing wire resetting operation automatically. In the known setup, the continuous wire electrode is broken by cutting with a blade and, prior to cutting, may be heated and thereby hardened to achieve a desired degree of straightness of the cut end thereof. In the conventional arrangement, an anvil is disposed in contact with the wire electrode, the knife blade disposed on the opposite side of the anvil with respect to the wire electrode is moved towards the anvil to make a groove on the wire electrode urged against the anvil and then the clamping means is operated to apply tension to break the wire electrode at the site of the groove. Experience has now shown that this arrangement often results in a failure in threading the broken wire electrode through the starting hole which most desirable is as small as possible upon repositioning of the machine setup. The failure of threading destroys the automatic resetting function and entails much and unexpected manual intervention by the operator to allow resumption of operation.

It has now been found that a source of conventional difficulty in the wire threading on the traveling-wire electroerosion machine lies in the configuration of grooving which has hitherto been applied in the wire electrode to be broken and reset. Thus, as shown in FIG. 3(a) in the accompanying drawing, the knife blade in the conventional arrangement has been operated to make a single groove go in the wire electrode E from one lateral side thereof. When the wire electrode E grooved in this manner is stretched and broken, each end portion of the broken wire tends to bend, as shown in FIG. 3 (b), due to different elongations at one side grooved and the other side not grooved. Because of the thinness of the wire electrode, a considerable degree of bending thus tends to develop.

It has been found that another source of the threading difficulty is attributable to a residue of the machining liquid that locally remains adherent on the wire electrode subsequent to the previous machining operation. When the wire electrode portion prior to breaking is heated for hardening, a stree tends to develop in the wire due to irregularity in the temperature rise between an area on which the liquid remains in an greater amount and another area on which the liquid remains in a lesser amount of does not practically adhere, the stress giving rise here again to a bending of the wire when broken.

OBJECTS OF THE INVENTION

It is, accordingly, an object of the present invention to provide an improved method of automatically resetting a wire electrode in an operating setup on a traveling-wire electroerosion machine whereby the wire electrode is threaded without fail and thus reset accurately and reliably to allow the subsequent machining operation to be commenced automatically.

Another object of the invention is to provide an automatic wire resetting apparatus in a travelling-wire electroerosion machine which is relatively simple and inexpensive and yet allows a reliable and fail-safe threading and resetting operation on a full automatic basis without the operator's intervention.

SUMMARY OF THE INVENTION

In accordance with the present invention, there is provided, in a first aspect thereof, a method of automatically resetting a wire electrode in an operating setup on an electroerosion machine, which method comprises: (a) terminating a previous machining operation by shutting off the supply of a machining electric current to the wire electrode and halting a machining axial advance of the wire electrode extending in a continuous stretch from a supply side to a collection side along a straight path formed through a workpiece; (b) breaking the wire electrode in a region adjacent to the workpiece and located at one of the opposite sides thereof by forming the wire electrode in the region with at least two coplanar grooves located substantially symmetrical about the center axis thereof and thereafter applying a tension to the wire electrode to allow the latter to be broken at the grooves; and (c) threading the broken wire electrode from one broken end portion thereof through a starting hole preformed in a workpiece for machining a contour therein in the subsequent machinine operation to reestablish the continuous stretch of the wire electrode between the supply side and the collection side thereof.

Prior to step (b) and subsequent to step (a), the method preferably includes the step of heating at least a portion of the wire electrode stretched continuously from the supply side to the collection side at least along the aforementioned region to achieve a hardening thereof.

Preferably, step (a) of the method further comprises halting the supply of a machining liquid to the wire electrode an the method further comprises, prior to step (b), the step of blowing off a residue of the machining liquid that remains adhere on the wire electrode.

The invention also provides, in a second aspect thereof, an apparatus for automatically resetting a wire electrode in an operating setup on an electroerosion machine including an electroerosion power supply for applying a machining electric current to the wire electrode, wire drive means for axially advancing the wire electrode extending in a continuous stretch from a supply side to a collection side and liquid supply means for furnishing a machining liquid to the wire electrode and a machining gap formed threby with a workpiece, the apparatus comprising: (a) switch means associated with the power supply and the wire drive means for shutting off the supply of the machining electric current to the wire electrode and halting a machining axial advance of the wire electrode in the continuous stretch, thereby terminating a previous machining operation commenced with a given starting hole; (b) wire breaking means comprising (b1) grooving cutter means having at least two blade means disposed in a region adjacent to the workpiece and at one of the opposite sides thereof for forming the wire electrode in the region with at least two coplanar cut grooves substantially symmetrical about the center axis thereof and (b2) tension means for applying a tension to the wire electrode to break the latter at the grooves; and (c) means for threading the wire electrode from one broken end portions thereof through a new starting hole preformed in a workpiece for machining a contour therein in the subsequent machining operation to reestablish the continuous stretch of the wire electrode between the supply side and the collection side.

The apparatus preferably further comprises means for heating, prior to breaking, the wire electrode for hardening thereof.

The apparatus also preferably includes further means for blowing off a residue of the machining liquid which remains adherent on at least a portion of the wire electrode to be heated by the heating means.

In accordance with another important feature of the present invention, there is provided in a first aspect there of a method of automatically resetting a wire electrode in an operating setup on a electroerosion machine, which method comprises: (a) terminating a previous machining operation by shutting off the supply of a machining electrical current to the wire electrode, halting a machining axial advance of the wire electrode extending in a continuous stretch between a supply side and a collection side along a straight path formed through a workpiece and halting the supply of a machining liquid to the wire electrode; (b) blowing off a residue of the machining liquid which remains adherent on the wire electrode at least in a region adjacent to the workpiece and at one of the opposite sides thereof; (c) heating the wire electrode at least in the said region; (d) breaking, by cutting, the heated wire electrode at the said region; and (e) threading the broken wire electrode from one broken end portion thereof through a starting hole preformed in a workpiece for machining a contour therein in the subsequent machining operation to reestablish the continuous stretch of the wire electrode between the supply and collection sides.

The invention also provides in a second aspect according to this feature thereof an apparatus for automatically resetting a wire electrode in an operating setup on an electroerosion machine including an electroerosion power supply for applying a machining electric current to the wire electrode, wire drive means for axially advancing the wire electrode extending from a supply side to a collection side in a continuous stretch along a straight path formed through a workpiece and liquid supply means for furnishing a machining liquid to the wire electrode and a machining gap formed thereby with the workpiece, the apparatus comprising: (a) switch means associated with the power supply, the wire drive means and the liquid supply means for shutting off the supply of the machining electric current to the wire electrode, halting a machining axial advance of the wire electrode and halting the supply of the machining liquid to the wire electrode, thereby terminating a previous machining operation; (b) gas jet means for applying a high-pressure stream of a gaseous fluid to the wire electrode in at least a region adjacent to the workpiece and located at one of the opposite sides thereof to blow off a residue of the machining liquid which remains adherent on the wire electrode at least in the said region; (c) heating means for heating the wire electrode at least in the said region; (d) breaking means for cutting the heated wire electrode at the said region; and (e) means for threading the broken wire electrode from one broken end portion thereof through a starting hole performed in a workpiece for machining a contour therein in the subsequent machining operation to reestablish the continuous stretch of the wire electrode between the supply and collection sides.

BRIEF DESCRIPTION OF THE DRAWINGS

These and other objects, features and advantages of the present invention will become more readily apparent from the following description of certain embodiments thereof as taken with reference to the accompanying drawing in which.

SPECIFIC DESCRIPTION

Figure 1:
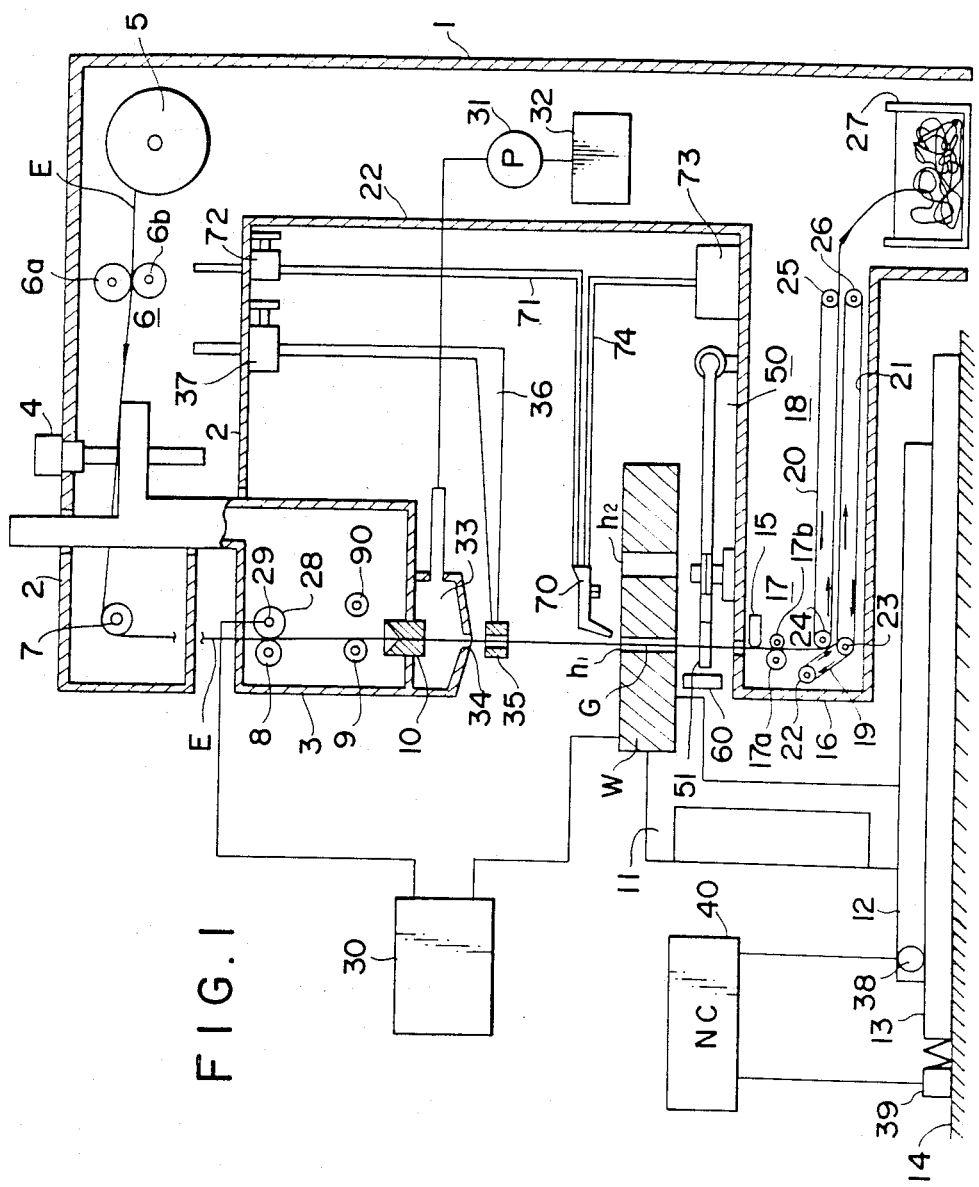
FIG. 1 is an elevational view essentially in section diagrammatically illustrating an automatic wire resetting apparatus incorporating the principles of the present invention.

Referring now to FIG. 1, a traveling-wire electroerosion machine is shown comprising a vertical column 1 formed with an upper horizontal extension 2. A machine head 3 is slidably carried by the horizontal extension 2 and vertically displaceable by a motor 4 for adjustment of its vertical position. A thin wire electrode E which is of a diameter, say, of 0.05 to 0.5 mm, is stored in a supply reel 5 shown mounted at an upper site in the column 1 and guided via brake rollers 6a, 6b and a guide roller 7 in the horizontal extension 2 and then via rollers 8 and 9 and a die guide 10 in the head 3 towards the region of a workpiece W, which is securely mounted on a work stand or table 11. The latter is carried on a crossslide table arrangement 12, 13 which is in turn carried on a base 14 of the machine. The wire electrode E is positioned in a machining relationship with the workpiece W by and between the die guide 10 located on its upper side in the head 3 and a slide guide 15 located on its lower side in a hollow arm 16 which extends horizontally from the vertical column 1 beneath the workpiece W. A wire drive unit 17 is disposed below the slide guide 15 within the hollow arm 16 and constituted as a pair of abutting rollers 17a and 17b one of which is driven by a motor (not shown) to give a continuous traction to the wire electrode E. Further shown arranged in the arm 16 is a wire pull-out system 18 comprising three endless belts 19, 20 and 21 wound on pairs of rollers: 22 and 23, 24 and 25; and 23 and 26, respectively. In this arrangement, the rollers 23 and 24 may be driven by a motor or motors (not shown) to move these belts and to seize the wire electrode E first between the moving belts 19 and 20 and then between the moving belts 20 and 21. The wire electrode E squeezed out from between the moving belts 20 and 21 is collected in a collection box 27.

Against the traction force exerted on the wire electrode E by the drive rollers 17a and 17b downstream of the workpiece W, the brake rollers 6a and 6b on the wire supply side are driven to apply an appropriate braking force to the wire electrode E so that the latter continuously travels from the supply side 5 to the collection side 27 at an appropriate rate of axial travel and under an appropriate tension. The guide roller 7 and the pull-out unit 18 serve to change the direction of wire travel from the supply side to the workpiece W and from the latter to the collection site 27, respectively. Downstream of the direction-changing guide roller 7, an electrically conductive roller 28 is disposed in an abutting relationship with the guide roller 8 to conduct the electroerosion current to the wire electrode E and is thus connected via a brush 29 to one output terminal of an electroerosion power supply 30 which has the other output terminal electrically connected to the workpiece via a conducting block (not shown). The electroerosion current is thus passed through the machining gap G formed between the wire electrode E and the workpiece W and flushed with a machining liquid. A pump 31 draws the machining liquid from a reservoir 32 to furnish it to a plenum chamber 33 attached to the head 3 to suspend from its lower end and formed with a liquid delivery opening 34. The machining liquid pumped into the chamber 33 is delivered through the opening 34 onto the traveling wire electrode E and carried into the machining gap G therewith. A tubular electromechanical tansducer 35 may be arranged, through which to allow the wire electrode E to pass and which is energized by a power supply (not shown) to impart a high-frequency mechanical vibration to the traveling wire electrode E to facilitate an electroerosion process. The transducer 35 is shown supported on an L-shaped arm 36 suspending from the outer wall of the horizontal extension 2 and its vertical position is adjusted by a position adjustment unit 37.

The cross tables 12 and 13 carrying the work stand 11 are driven in an X-Y plane, by means of an X-axis motor 38 and a Y-axis motor 39 drivingly coupled therewith, respectively. The motors 38 and 39 are energized with X-axis and Y-axis drive signals furnished from a numerical-control (NC) unit 40 to displace the workpiece W relative to the axis of the wire electrode E to establish a given relative machining-start position preprogrammed in the NC unit 40 and to displace the workpiece W relative to the axis of the traveling wire electrode E along a prescribed cutting path preprogrammed in the NC unit 40.

The apparatus shown is further provided with a wire braking unit 50 and a wire heating unit 60.

Figure 2:
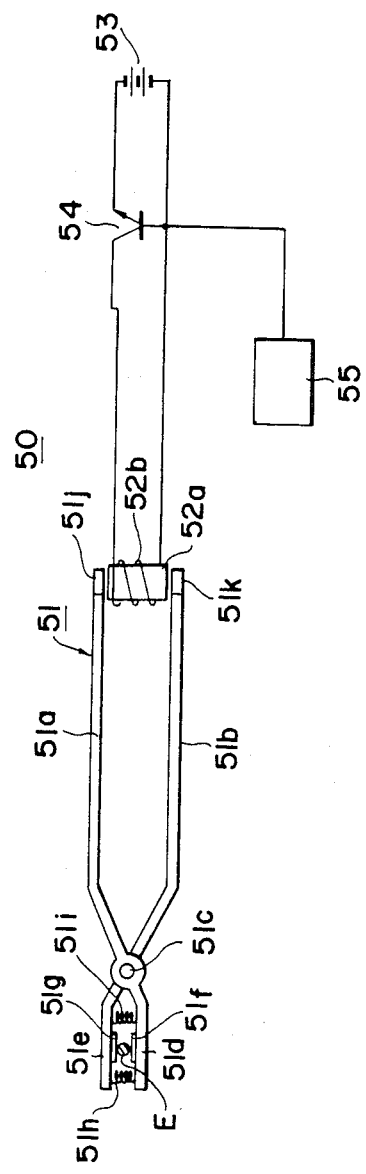
FIG. 2 is a schematic view of a grooving tool embodied in the apparatus of FIG. 1 according to the present invention.

The wire breaking unit 50 is shown disposed immediately beneath the workpiece W and supported on the arm 16. As more specifically shown in FIG. 2, the unit 50 may comprise a grooving tool 51 in the form of a cutting plier having a pair of legs 51a and 51b hinged at a pin 51c and crossed thereat to extend into a pair of fingers 51d and 51e, respectively. The fingers 51d and 51e are formed with blades 51f and 51g, respectively, which are opposed and normally sufficiently spaced apart by means of springs 51h and 51i bridged across the fingers 51d and 51e. The blades wire pull-out unit 18 and the braking unit 6 are deenergized to halt the axial drive of the wire electrode E and the pump 31 is deactuated to discontinue the delivery of the machining liquid to the wire electrode E. Then the cross-table unit 12, 13 may be or may have been driven to return the position of the axis of the wire electrode E to the original starting hole h1. In this state, the wire electrode E remains threaded through the hole h1 and stretched stationarily along the machining wire drive path. A roller 91 disposed in the head 3 at the same level as the roller 9 is now moved to come into engagement with the latter to define a stretch of the wire electrode E between them and the rollers 17a and 17b. For proceeding with the wire breaking step, the heater means 60 may be actuated to heat the stretch of the wire electrode E at least in the region of the cutting tool 51, thereby removing the internal stress and effecting hardening of the wire electrode E. At the same time, the wire braking drive unit 6 is driven to a predetermined extent to stretch the wire electrode E being heated to maintain its straightened state as desired. The heating unit may be an external heater of any conventional design but may also be a direct heating system for passing a heating current directly through a stretch of the wire electrode E between say, the die guide 10 and the slide guide 15. The simultaneous heating and stretching is advantageous to achieve straightening and smoothening of the wire electrode E.

Figures 3A, 3B, 4A, 4B:
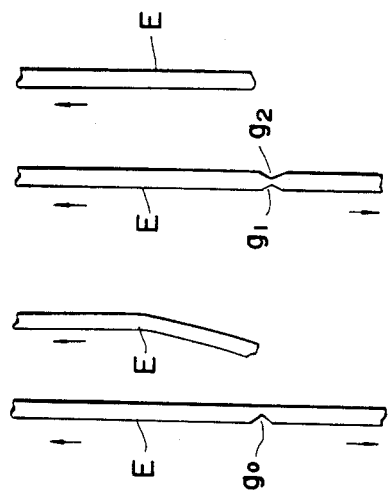
FIGS. 3(a) and 3(b) are schematic views of a wire electrode grooved and broken according to the conventional method and apparatus.
FIGS. 4(a) and 4(b) are schematic views of a wire electrode grooved and broken according to the invention.

After or immediately upon deactuation of the heating unit 60 or terminating the heating current, the signal generator 55 in the wire breaking system 50 is actuated to render the switch 54 conductive. The coil 52b is then energized by the power supply 53 to electromagnetically attract the magnetic pieces 51j and 51k to the core member 52a. This causes the blades 51f and 51g to come into engagement with the wire electrode E to form the latter with a pair of coplanar grooves g1 and g2 symmetrical about the axis thereof as shown in FIG. 4 (a). When the signal ends, the coil 52b is deenergized to allow the blades 51f and 51g to return into disengagement with the wire electrode E. The wire braking drive unit 6 is now again actuated to give a sufficient tension to allow the wire electrode E to be broken at the grooves g1 and g2. The braking drive 6 may continue to be driven by a predetermined extent to allow the upper broken end of the wire electrode E to be removed from the hole h1 to a suitable position above the upper surface of the workpiece W. At the same time, the pull-out unit 18 is actuated to remove the lower portion of the broken wire to the collection box 27. The work drive unit 12, 13 is then actuated to displace the workpiece W to position a next starting hole h2 immediately below the retracted upper broken end of the wire electrode and coaxial therewith. Thereafter one of the abutting guide rollers 9 and 90 is driven by a motor (not shown) to advance the upper broken end of the wire electrode E into, through and out of the starting hole h2 and then through the drive rollers 17a and 17b unit it comes in contact with the belts 19 51f and 51g are designed to be coplanar and positioned, in the arrangement of FIGS. 1 and 2, so as to place the wire electrode E between them in such a manner that the axis of the wire electrode E passes precisely perpendicular to the plane of the blades 51f and 51g and out of contact with these blades. The legs 51a and 51b of the tool 51 are formed at their respective ends with magnetic pieces 51j and 51k having a core member 52a of a solenoid 52b placed therebetween. By virtue of the springs 51h and 51i, the magnetic pieces 51j and 51k are normally spaced from the core member 52a. The solenoid coil 52b is energizable by a DC source 53 via a switch 54 shown by a transistor designed to be turned on by a signal generator 55. When the switch 54 is rendered conductive in response to an automatic signal furnished from the generator 55, the solenoid 52 is actuated to electromagnetically attract the magnetic pieces 51j and 51k to the core member 52b. This causes the blades 51f and g in the tool member 51 to come into engagement with the wire electrode E to form a pair of coplanar grooves symmetrical about the center axis thereof as shown in FIG. 4(a) and designated at g1 and g2 therein. The grooves g1 and g2 should have an appropriate depth which may be determined by the length of the core member 52a interposed between the magnetic pieces 51j and 51k.

At the end of a given traveling-wire electroerosion machining operation, the power supply 30 is switched off to discontinue the supply of the electroerosion current to the wire electrode E, and the drive motors for the wire traction unit 17, the and 20. The drive unit 17 and the pull-out unit 18 are then actuated to allow the lupper broken end of the wire electrode E to be squeezed and advanced by and between the moving belts 20 and 21 and eventually to be led into the collection box 27. The original continuous stretch of the wire electrode E is thus re-established from the supply side 5 and the collection side 27.

In the wire resetting operation, therefore, breaking of the wire electrode to provide a straight broken end thereof is achieved without fail, permitting the broken end to be threaded into and through a new starting hole without fail.

The apparatus of FIG. 1 also includes a air jet nozzle 70 ahown supported on an L-shaped arm 71 suspending from the outer wall of the horizontal extension 2 and provided with a position adjustment unit 72 to adjust its vertical position. The nozzle 70 is fed with a pressurized gas, e.g. air, from a compressor or any other pressurized gas supply 73 via a conduit 74 to apply a stream of the pressurized gas or air to the region of the previous starting hole h1 and the previously machined contour in the workpiece W an to the portion of the wire electrode E therein and the portion of the wire electrode E in the region therebelow to be heated with the heater 60 and grooved by the grooving tool 51 and broken. By virtue of the pressurized gas or air applied to these regions, and residue to the machining liquid that may remain adherent on the wire electrode E in the heating region is blown off and the wire electrode E is allowed to be uniformly heated practically without causing any localized thermal stress. This allows the wire electrode E in the resetting operation to be broken to provide a straight broken end thereof without fail, permitting the broken end to be threaded into and through a new starting hole without fail.

What is claimed is:

1. A method of automatically resetting a wire electrode in an operating setup on an electroerosion machine, comprising:
  (a) terminating a previous machining operation by shutting off the supply of a machining electrical current to said wire electrode and halting a machining axial advance of said wire electrode extending in a continuous stretch from a supply side to a collection side along a straight path through a workpiece;
  (b) breaking said wire electrode in a region adjacent to said workpiece and located at one of the opposite sides thereof by forming said wire electrode in said region with at least two coplanar grooves substantially symmetrical about the axis thereof by advancing symmetrically oppositely into said wire electrode from opposite sides, two symmetrical grooving tools of essentially equivalent size and shape, and then applying tension to said wire electrode of a magnitude sufficient to break the wire electrode at said grooves; and
  (c) threading said wire electrode from one broken end portion through a starting hole preformed in a workpiece for machining a contour therein in the subsequent machining operation to reestablish the continuous stretch of the wire electrode between said supply side and said collection side.

2. An apparatus for automatically resetting a wire electrode in a operating setup on an electroerosion maching including an electroerosion power supply for applying a machining electric current to the wire electrode, wire drive means for axially advancing the wire electrode extending in a continous stretch from a supply side to a collection side and liquid supply means for furnishing a machining liquid to the wire electrode and a machining gap formed thereby with a workpiece, the apparatus comprising:

(a) switch means associated with the power supply and the wire drive means for shutting off the supply of said machining electric current to said wire electrode and halting a machining axial advance of said wire electrode in said continuous stretch, thereby terminating a previous machining operation commenced with a given starting hole;

(b) wire breaking means comprising:
  (b1) grooving cutter means having at least two blade means of essentially equivalent size and shape disposed in a region adjacent to the workpiece and at one of the opposite sides thereof opposite one another across said wire electrode for forming said wire electrode in said region with at least two coplanar grooves substantially symmetrical about the center axis thereof, and
  (b2) tension means for applying a tension to said wire electrode to break the latter at said grooves; and (c) means for threading said wire electrode from one broken end portion thereof through a next starting hole preformed in a workpiece for machining a contour therein in the subsequent machining operation to reestablish the continuous stretch of said wire electrode between said supply side and said collection side.

* * * * *